United States Patent
Gauf et al.

(10) Patent No.: US 10,572,821 B1
(45) Date of Patent: Feb. 25, 2020

(54) METHOD AND SYSTEM FOR ANTHROPOMORPHIC INTERACTION AND AUTOMATION OF COMPUTER SYSTEMS

(71) Applicant: Innovative Defense Technologies, LLC, Arlington, VA (US)

(72) Inventors: Bernard Gauf, Vienna, VA (US); Scott Bindas, Rochester, MA (US); William R. Stubbs, Woodstock, CT (US); Joshua Mann, West Warwick, RI (US)

(73) Assignee: INNOVATIVE DEFENSE TECHNOLOGIES, LLC, Arlington, VA (US)

( * ) Notice: Subject to any disclaimer, the term of this patent is extended or adjusted under 35 U.S.C. 154(b) by 677 days.

(21) Appl. No.: 15/094,204

(22) Filed: Apr. 8, 2016

Related U.S. Application Data

(60) Provisional application No. 62/145,221, filed on Apr. 9, 2015.

(51) Int. Cl.
*G06N 5/02* (2006.01)
*G06N 99/00* (2019.01)
(Continued)

(52) U.S. Cl.
CPC ........... *G06N 20/00* (2019.01); *G06F 9/4881* (2013.01); *G06N 5/025* (2013.01)

(58) Field of Classification Search
CPC .................................................. G06N 99/005
See application file for complete search history.

(56) References Cited

U.S. PATENT DOCUMENTS 8,635,094 B2 * 1/2014 Hubbard ............... G06Q 10/06
705/7.11
8,826,084 B1 * 9/2014 Gauf .................. G06F 11/3688
714/32

(Continued)

OTHER PUBLICATIONS

"UICO: An Ontology-Based User Interaction Context Model for Automatic Task Detection on the Computer Desktop," Andreas S. Rath et al., Proceedings of the 1st Workshop on Context, Information and Ontologies, Jun. 1, 2009), , Heraklion, Greece © ACM 2009 ISBN: 978-1-60558-528-4 (Year: 2009).*

*Primary Examiner* — Hal Schnee
(74) *Attorney, Agent, or Firm* — Hunton Andrews Kurth LLP

(57) ABSTRACT

According to an embodiment of the present invention, a computer implemented system that automates development, maintenance and execution of procedures to autonomously interact with one or more external devices, comprises: an input configured to receive interaction data and to detect state data from an external computer system, the user interaction data comprising GUI data; a memory component configured to store the interaction data, the state data and relationship data between objects, events and resultant states where an event represents an interaction with the external computer system and where a resultant state represents a state resulting from an interaction; a semantic processor configured to interpret the interaction data into semantic objects and develop a system model, using a learning algorithm, based on the semantic objects, the state data and the relationship data; and an execution processor configured to execute tasks and roles accounting for environmental perturbations and system randomness.

20 Claims, 11 Drawing Sheets

(51) Int. Cl.
*G06N 20/00* (2019.01)
*G06F 9/48* (2006.01)

(56) References Cited

U.S. PATENT DOCUMENTS

| | | | | |
|---|---|---|---|---|
| 2007/0050755 A1* | 3/2007 | Mizrachi | G06F 21/55 | 717/116 |
| 2007/0053252 A1* | 3/2007 | Gangadhar | G06F 11/008 | 369/36.01 |
| 2009/0006975 A1* | 1/2009 | Salim | G06Q 10/10 | 715/738 |
| 2009/0064000 A1* | 3/2009 | Garbow | G06F 3/0482 | 715/762 |
| 2009/0119587 A1* | 5/2009 | Allen | G06F 3/038 | 715/705 |
| 2011/0288931 A1* | 11/2011 | Kuhn | G06Q 30/02 | 705/14.49 |

* cited by examiner

METHOD AND SYSTEM FOR ANTHROPOMORPHIC INTERACTION AND AUTOMATION OF COMPUTER SYSTEMS

CROSS-REFERENCE TO RELATED APPLICATIONS

This application claims priority to U.S. Provisional Application Ser. No. 62/145,221 filed Apr. 9, 2015, the contents of which are incorporated herein in its entirety.

This application is related to U.S. patent application Ser. No. 13/605,182, filed on Sep. 6, 2012, now U.S. Pat. No. 8,826,084, issued on Sep. 2, 2014, which claims priority to Provisional Application No. 61/531,769 filed on Sep. 7, 2011; U.S. patent application Ser. No. 13/687,311, filed on Nov. 28, 2012, now U.S. Pat. No. 9,135,714, issued Sep. 15, 2015, which claims priority to Provisional Application No. 61/564,009 filed on Nov. 28, 2011 and U.S. patent application Ser. No. 13/718,295, filed on Dec. 18, 2012, which claims priority to Provisional Application No. 61/577,298 filed on Dec. 19, 2011. The contents of these applications are incorporated herein by reference in their entirety.

FIELD OF THE INVENTION

The present invention relates generally to automated computer systems and more specifically to automating the development, maintenance, and execution of procedures to autonomously interact with one or more computer systems.

BACKGROUND OF THE INVENTION

The automation of a human user's interactions with one or more computer systems has become an evolving and increasing trend in Internet Technology (IT) and software development domains. Automating traditional human interactions was intended to reduce the cost and increase the efficiency of human resources required to perform those duties. In addition, automation is beneficial as it can eliminate errors and inaccuracies often introduced by the fatigue and external distractions that a human user may be susceptible to.

Currently, automating the interaction with computers systems involves defining the explicit procedures required to perform those interactions, usually by some form of script, macro, or workflow. For this reason, the robustness and complexity of those interactions are limited to what has been specifically included in the automation procedures, and requires that such procedures account for all possible system states or responses during their execution. As a result, these procedures cannot account for unexpected deviations in the computer system which may result in the unintended behavior or ultimate failure of the automation. Ultimately, the verbosity and precision required by traditional automation procedures can increase build and maintenance costs over time in order to account for these limitations, and in some cases, erode the expected return on investment that automation intends to provide.

Other drawbacks may also be present.

SUMMARY OF THE INVENTION

Accordingly, one aspect of an embodiment of the present invention is to address one or more of the drawbacks set forth above. According to an exemplary embodiment, a computer implemented system that automates development, maintenance and execution of procedures to autonomously interact with one or more external devices, comprises: an input configured to receive interaction data and to detect state data from an external computer system, the user interaction data comprising GUI data; a memory component configured to store the interaction data, the state data and relationship data between objects, events and resultant states where an event represents an interaction with the external computer system and where a resultant state represents a state resulting from an interaction; a semantic processor configured to interpret the interaction data into semantic objects and configured to develop a system model, using a learning algorithm, based on the semantic objects, the state data and the relationship data; and an execution processor configured to execute tasks and roles accounting for environmental perturbations and system randomness, where the task defines interactions with the semantic objects and where the role is constructed by incorporating the task; where the execution processor derives one or more of: workflow, rules, events and states required by a given task or role and employing a respective engine for each.

According to another embodiment, a computer implemented method that automates development, maintenance and execution of procedures to autonomously interact with one or more external devices using an interactive interface provided by a computer processor, comprises the steps of: receiving, via an electronic input, interaction data and state data from an external computer system, the user interaction data comprising GUI data; storing, via a memory component, the interaction data, the state data and relationship data between objects, events and resultant states where an event represents an interaction with the external computer system and where a resultant state represents a state resulting from an interaction; interpreting, via a semantic processor, the interaction data into semantic objects; developing a system model, using a learning algorithm, based on the semantic objects, the state data and the relationship data; and executing, via an execution processor, tasks and roles accounting for environmental perturbations and system randomness, where the task defines interactions with the semantic objects and where the role is constructed by incorporating the task, where the execution processor derives one or more of: workflow, rules, events and states required by a given task or role and employing a respective engine for each.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF THE EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Traditional automation has empirically demonstrated a strong divide between what humans and computers do well. The benefits of traditional automation include a reduction in the cost of executing a task, less mistakes, as well as an increase in efficiency, speed, and reuse. However, traditional automation systems do not operate with the level of intelligence and intrinsic understanding of computer systems that is commonplace for a traditional human user. As automation tasks become more complex, this lack of intelligence and understanding increases the specificity and maintenance required to construct automation procedures that are useful and produce meaningful results in real-world situations.

An embodiment of the present invention is directed to a machine learning and artificial intelligence system that automates the development, maintenance, and execution of procedures to autonomously interact with one or more computer systems. According to an exemplary embodiment of the present invention, a focus of this system is to advance the state of computer automation by directly incorporating machine learning and artificial intelligence technologies in a manner capable of: learning how an external system behaves; learning the requisite goals and tasks of one or more defined roles; and intelligently executing those roles and tasks, accounting for environment perturbations and/or randomness in the system.

Figure 1:
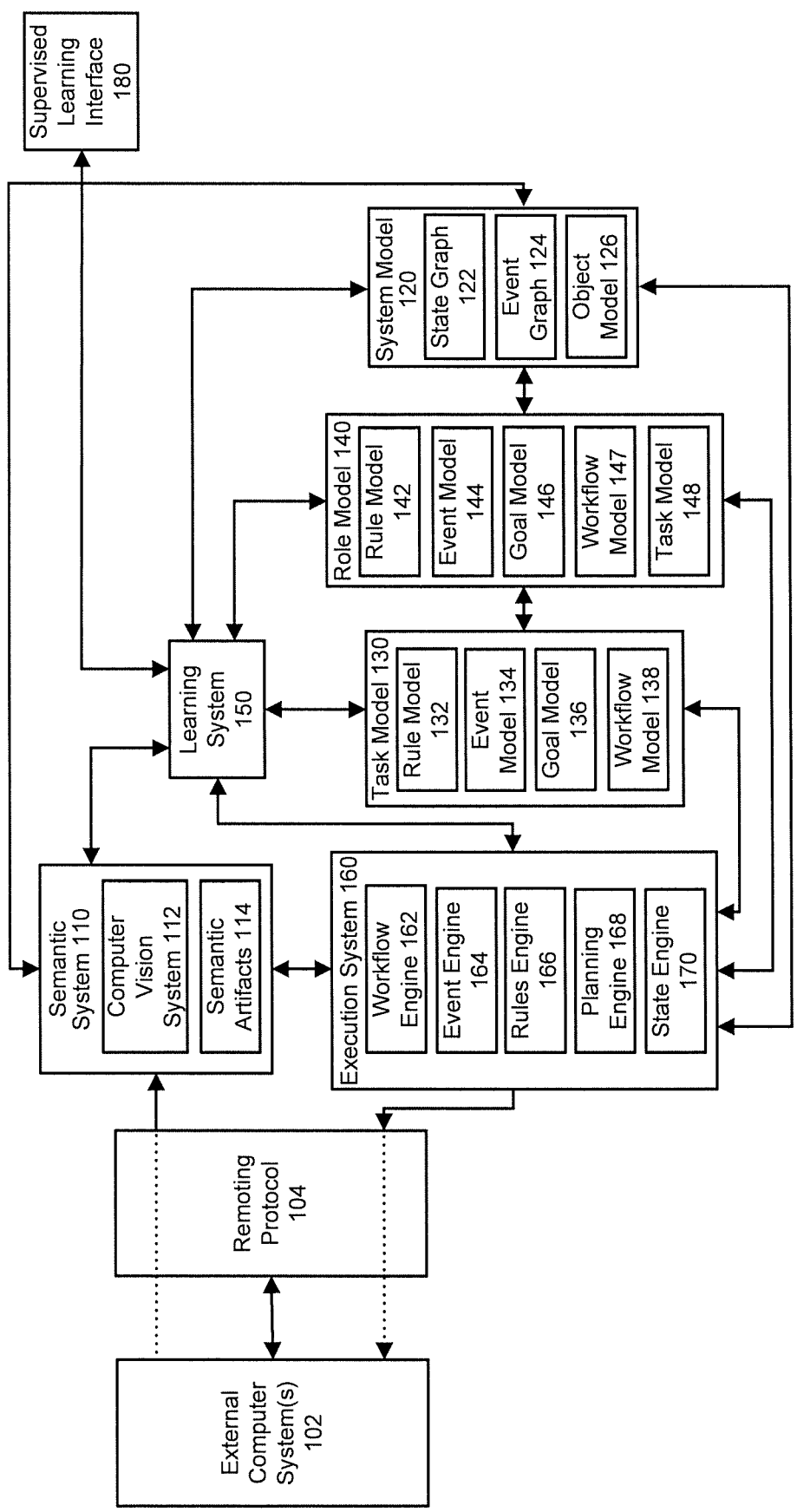
FIG. 1 is an exemplary diagram of a system for anthropomorphic interaction and automation, according to an embodiment of the present invention.

FIG. 1 is an exemplary diagram of a system for anthropomorphic interaction and automation, according to an embodiment of the present invention. As shown in FIG. 1, an exemplary system comprises Semantic System 110; System Model 120; Task Model 130; Role Model 140; Learning System 150 and Execution System 160. FIG. 1 illustrates the relationship between these systems and their structure. FIG. 1 is an exemplary illustration of a system diagram, in accordance with an embodiment of the present invention. Variations may be realized and implemented.

For example, each system and model of FIG. 1 may include various modules and components to perform analytics, data processing and interfacing functionality. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Each system and model illustrated in FIG. 1 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via a communication network. As shown in FIG. 1, External Computer System 102 may communicate with Semantic System 110 and Execution System 160, via a communication network. Also, Learning System may communicate with Supervised Learning Interface 180.

The communication networks and links illustrated in FIG. 1 may be a wireless network, a wired network or any combination of wireless network and wired network. For example, the communication networks and links illustrated in FIG. 1 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network may include, without limitation, telephone line, fiber optics, IEEE Ethernet 802.3, wide area network ("WAN"), local area network ("LAN"), or global network such as the Internet. The communication network may support an Internet network, a wireless communication network, a cellular network, or the like, or any combination thereof. The communication network may further include one, or any number of the exemplary types of networks mentioned above operating as a stand-alone network or in cooperation with each other. The communication network may include a plurality of mobile switching centers (MS Cs) and a plurality of signaling control points (SCPs).

The communication networks and links illustrated in FIG. 1 may utilize one or more protocols of one or more network elements to which it is communicatively coupled. The communication network may translate to or from other protocols to one or more protocols of network devices. Although the communication network is depicted as a single network, it should be appreciated that according to one or more embodiments, the communication network may comprise a plurality of interconnected networks, such as, for example, a service provider network, the Internet, a broadcaster's network, a cable television network, corporate networks, and home networks.

Each System and Model may access databases, memory and/or other sources of information in accordance with an embodiment of the present invention. The databases may be further combined and/or separated. The databases may reside at a single location or separated through multiple locations. In addition, the databases may be supported by an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data and information may be stored and cataloged in Databases which may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to each of the System and Models, which, in some embodiments, it is accessible through a network, such as communication networks and links, as illustrated in FIG. 1, for example.

Figure 2:
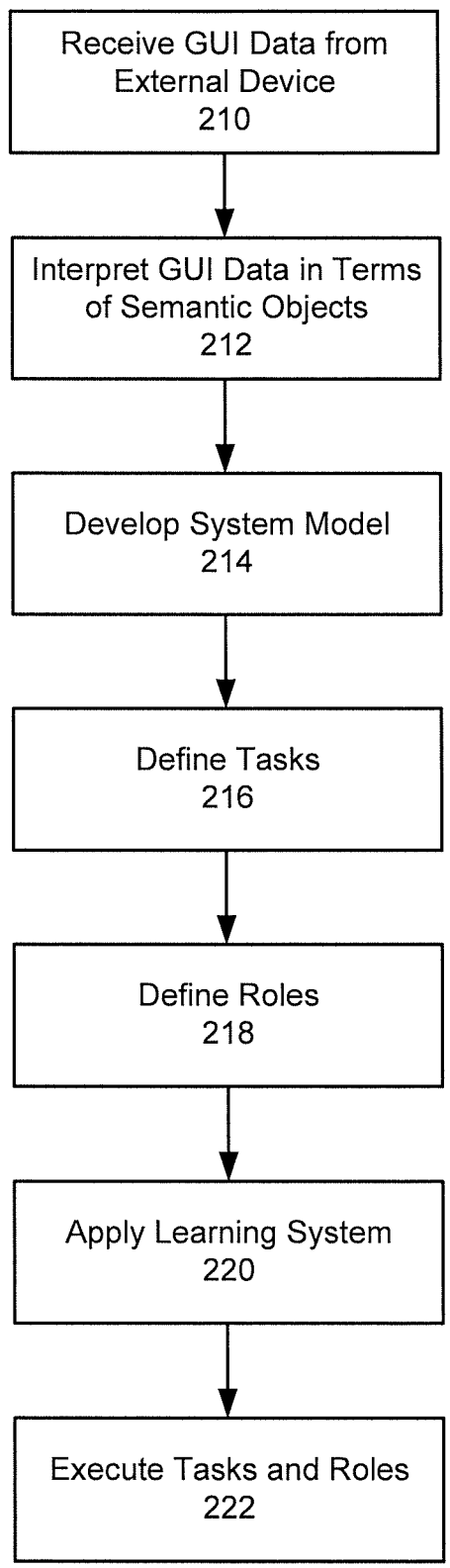
FIG. 2 is an exemplary flowchart illustrating a method for anthropomorphic interaction and automation, according to an embodiment of the present invention.

FIG. 2 is an exemplary flowchart illustrating a method for anthropomorphic interaction and automation, according to an embodiment of the present invention. At step 210, GUI data from an External Computer System may be received. At step 212, the GUI data may be interpreted in terms of semantic objects. At step 214, a system model of the external computer system may be developed. At step 216, tasks may be defined via a Task Model. At step 218, roles may be defined via a Role Model. At step 220, a learning system may be applied. At step 222, roles and tasks may be executed via an Execution System. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, GUI data from an External Computer System may be received. An embodiment of the present invention is directed to accessing data from a device, such as an External Computer system. The data may represent a user's interaction with the device. The data may include GUI data, user interaction data and/or other data that indicates how the device behaves, performs, functions, etc. Additional device specific information may be received as well as device environment data.

At step 212, the GUI data may be interpreted in terms of semantic objects. The received data, which may include GUI and other data may be interpreted as semantic objects. For example, semantic objects may include user interface icons and other interface tools, objects, and graphic. Other forms of semantic objects may include any object that represents property, relationship and/or other data associated performance, operation and/or functioning of an external device.

At step 214, a system model of the external computer system may be developed. The System Model may represent an external device in terms of structure, operation, behavior, characteristic and/or other combination thereof. According to an exemplary embodiment, the system model may incorporate semantic objects, states and events associated with an external device. For example, an Object Model may store semantic objects and further classify and categorize the objects. State Graph may store detected states and organize the states into hierarchies and/or other data structures. Event Graph may store relationships between semantic objects, events and resultant external device states.

At step 216, tasks may be defined via a Task Model. Task Model may store user defined tasks that may be constructed by defining interactions with semantic objects of the external device. For example, tasks may include actions taken by a particular type of user or user with a specific role.

At step 218, roles may be defined via a Role Model. Role Model may store user defined roles that may be constructed by incorporating tasks. Roles may also incorporate a combination of rules, event handles, goals and/or workflows. An external device may have various uses, functions and applications that may be invoked in various ways by a user with a specific role. For a particular external system, device, application, function, etc., each role may be associated with various tasks.

At step 220, a Learning System may be applied. The Learning System may include machine learning and artificial intelligence to evolve the definition and execution of defined roles and tasks. The Learning System may be applied to understand or otherwise ascertain an intent or goal of a user as well as how the user is implementing or using an external device, system, application, etc. The Learning System may include supervised learning where example inputs and desired outputs along with goals may be provided. The Learning System may also include unsupervised learning where the system is provided a goal without a specific structure or inputs. Other forms of machine learning, analytics, pattern recognition, computational learning, processing and algorithms may be implemented in accordance with the embodiments of the present invention.

At step 222, roles and tasks may be executed via an Execution System. The Execution System may intelligently execute the defined roles and tasks and further account for environmental perturbations, randomness and/or other factors and considerations associated with the external device. According to an exemplary application, the Execution System may include various engines including Workflow Engine, Event Engine, Rules Engine, Planning Engine and State Engine to execute the roles and tasks. The various engines may be further combined and/or distributed across multiple remote locations.

As shown in FIG. 1, External Computer System 102 may communicate with Semantic System 110 and Execution System 160 via a Remoting Protocol 104. Remoting Protocol 104 may be optional. Also, other intermediaries and/or protocols may be implemented.

According to an exemplary embodiment of the present invention, Semantic System 110 provides the ability to interpret the graphical user interface (GUI) data of an External Computer System (ECS) 102 in terms of higher level semantic objects through the use of Computer Vision techniques and algorithms, represented by Computer Vision System 112. These semantic objects may include, but are not limited to, buttons, menu items, scrollbars, windows, and other objects inherent to modern graphical windowing systems. In addition, Semantic System 110 may also interpret higher level semantic objects that are unique to applications installed on the ECS. These may include, but are not limited to, icons, imagery, and customized graphical elements. Semantic System 110 may also provide the ability to interpret from an external GUI data what semantic objects are present at a given moment in time, what the properties (e.g., type, size, location, and state, etc.) of each object are, and the given context of each object with respect to the current state of the external system. Semantic Artifacts 114 may store relationships and mappings between semantic objects and pertinent raw visual data processed by Semantic System 110 used to derive the objects. In addition, Semantic Artifacts 114 may store relationships and mappings between semantic objects and data utilized within Learning System 150, such as classifiers, training data, and testing sets and/or other data.

Also, Semantic System 110 provides the ability to identify aspects of the external GUI data from which semantic objects are generally not able to be derived. In this case, Learning System 150 may be employed to derive new semantic objects, and/or variations of existing semantic objects from previously unclassifiable data.

For example, when a user interacts with a semantic object, Semantic System 110 may detect this interaction and interpret the user's interaction as one or more events. Such events may include, but are not limited to, mouse and keyboard events as well as other interactions. Similarly, the events that are applicable to a semantic object may be derived via the object's type and previously categorized data. For example, if the semantic type BUTTON, with applicable event CLICK, has already been defined, then the semantic objects of type BUTTON may be understood as being "Clickable." In the event that a new semantic type is encountered, such as a "Custom Image," then any event the user performs on that object may be associated by the Semantic System as being applicable to that object type. In this manner, the Semantic System continuously builds and expands the knowledge of semantic objects, their types, and associated events applicable to them for a given external system. As most objects and their behaviors in computer systems are standardized and consistent, the knowledge generated by these associations may be reapplied with high probability of success against new systems or configurations in the future.

Semantic System 110 may detect changes, deviations and/or modifications associated with the ECS. When the state of the ECS changes, Semantic System 110 has the ability to detect these state changes and interpret the probable cause. For example, if a new window appears after a button is clicked, an embodiment of the present invention may interpret the state change of the window appearing as being caused by the click of the button. As a result, a cause-and-effect map of events and their state changes, or more simply an Event Map, may be generated and continuously expanded. In addition, a State Map may be generated that maps what ECS states are reachable from a previous state. Other forms of data, including logs, tables, animations, graphics, for example, may be implemented to detect and maintain state changes.

According to an embodiment of the present invention, Semantic System 110 may employ System Model 120 to persist and update the semantic objects, events, and states, as well as, updates their respective categorizations, classifications, hierarchies, and correlations.

Semantic System 110 may retrieve the graphical user interface (GUI) data from ECS 102, either via direct interfaces including, but not limited to VGA, DVI, and/or HDMI, or via remoting interfaces including, but not limited to, VNC and RDP.

Figure 3:
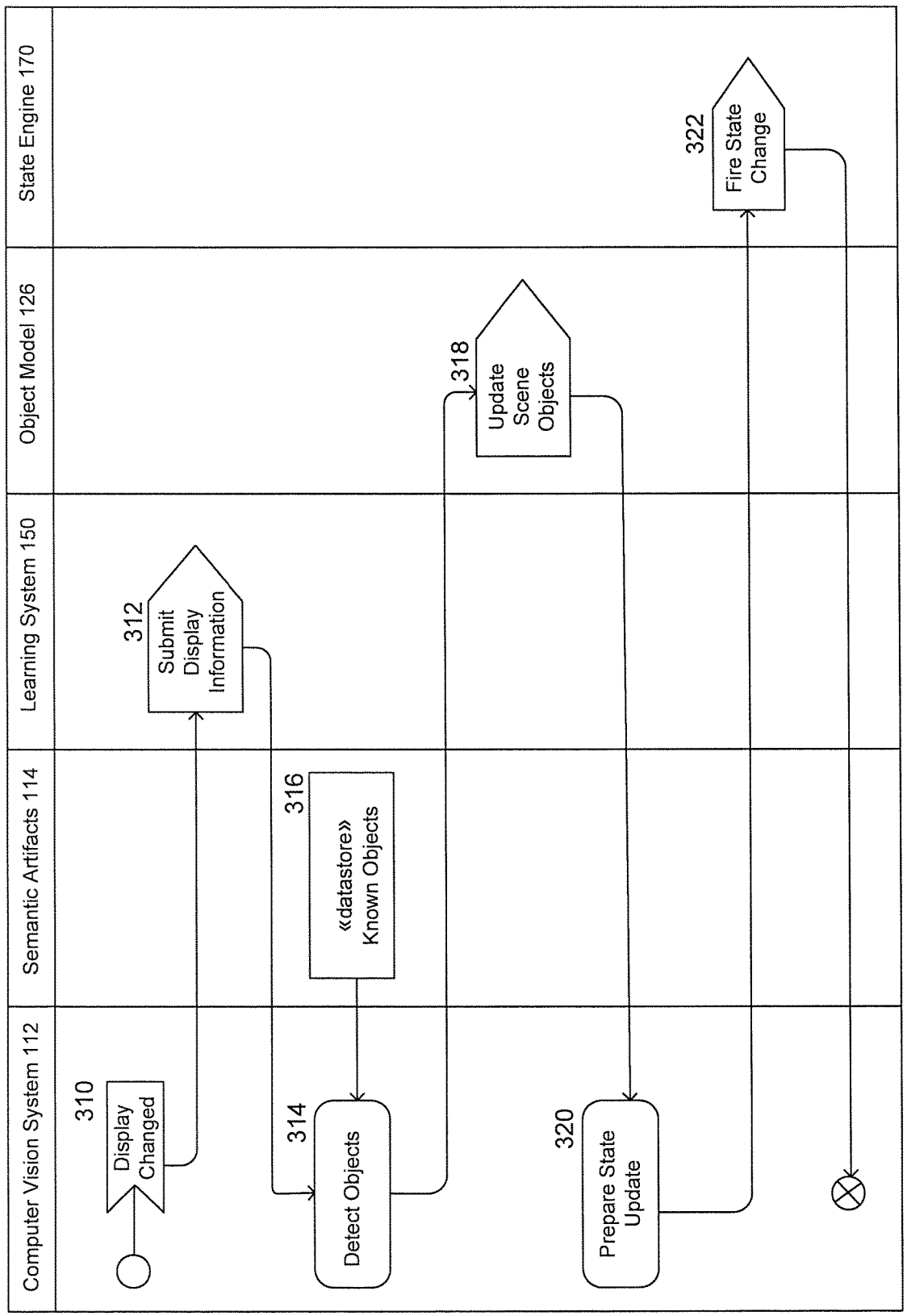
FIG. 3 is an exemplary flow diagram illustrating a Semantic System, according to an embodiment of the present invention.

FIG. 3 is an exemplary flow diagram illustrating a Semantic System, according to an embodiment of the present invention. As shown in FIG. 3, Computer Vision System 112 detects a change in a display. The display may represent a display or other user interface on an external device or system. Other and/or additional data may be detected by Computer Vision System 112. The display information may be submitted to Learning System 150. Computer Vision System 112 may detect objects, which may be stored by Semantic Artifacts 114 in a datastore or other memory component. Object Model 126 may update Scene Objects, as shown by 318. In response, Computer Vision System 112 prepares a State Update, as shown by 320. State Engine may then fire State Change, as shown by 322. FIG. 3 is an exemplary illustration; the steps may be modified and/or otherwise varied.

According to an embodiment of the present invention, System Model 120 may be a detailed model of the external computer system (ECS) that incorporates Object Model 126, State Graph 122; and Event Graph 124. The comprehensive structure and behavior of the ECS may be represented in its entirety within the System Model. The System Model may be designed with the capability of representing one or many systems and/or applications.

According to an embodiment of the present invention, semantic objects that have been identified within an ECS may be stored within Object Model 126 as well as the associated with the state of the ECS in which they were found. In addition, any applicable object properties may also be stored in this model. In addition, facilities to categorize and classify these objects may be present within Object Model 126.

According to an embodiment of the present invention, State Graph 122 may store detected states of the ECS. These states may be organized into hierarchies (or other structure/ scheme) that define what possible new states are reachable from any given state. In addition, the events that change from one state to another are also discernable from this model. Facilities to categorize, classify and manage these states may also be present within State Graph 122.

According to an embodiment of the present invention, Event Graph 124 may store relationships between semantic objects, their applicable events, and the resultant ECS state the invocation of those events produce. Facilities to categorize, classify and manage these events are may also be present within Event Graph 124.

Figure 4:
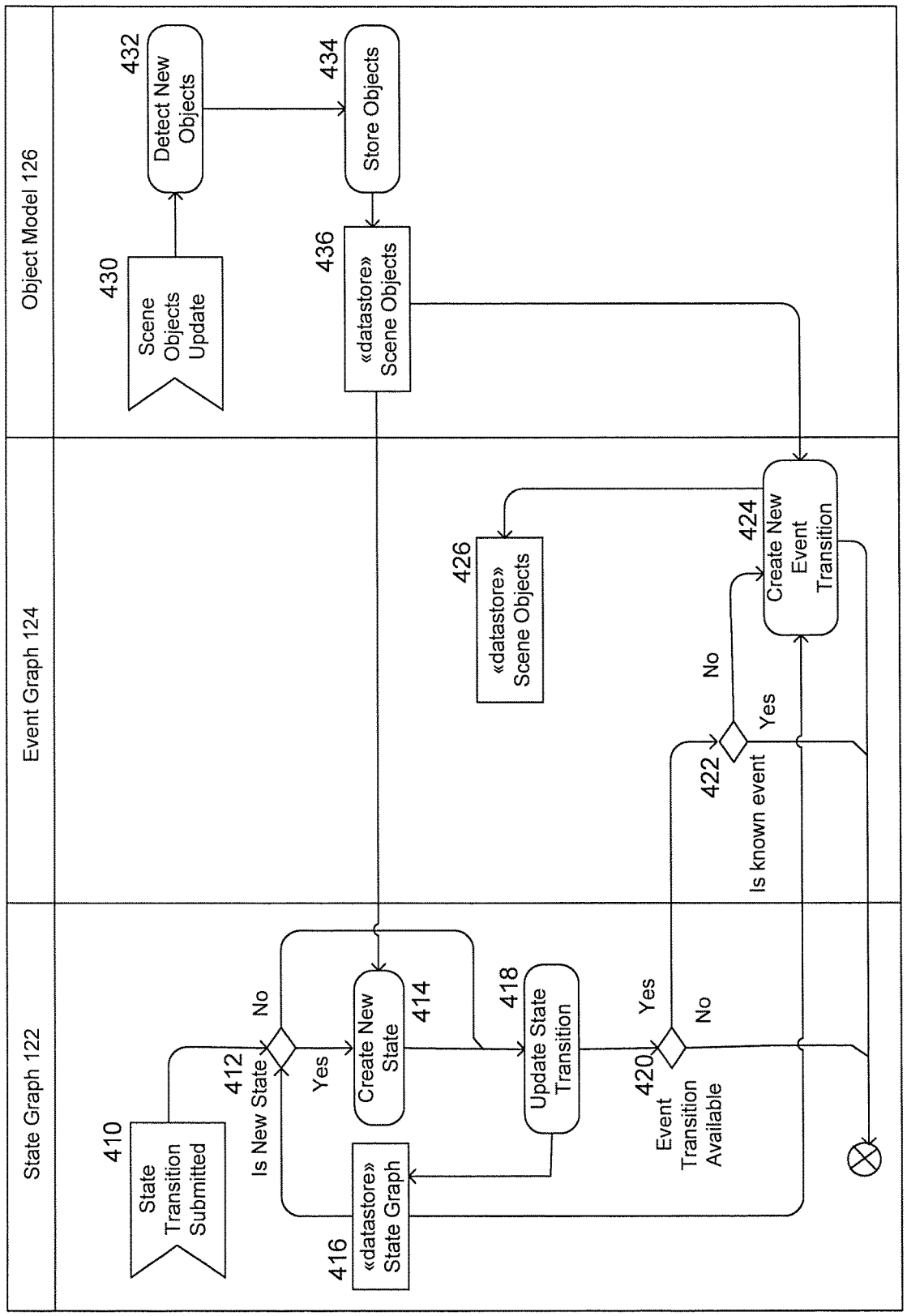
FIG. 4 is an exemplary flow diagram illustrating a System Model, according to an embodiment of the present invention.

FIG. 4 is an exemplary flow diagram illustrating a System Model, according to an embodiment of the present invention. FIG. 4 illustrates an exemplary interaction between and among State graph 122, Event Graph 124 and Object Model 126. As shown in FIG. 4, state transition may be submitted at 410. State Graph 122 may determine whether the state is a new state, at 412. If yes, a new state may be created at 414 and then stored in a datastore at State Graph, as shown by 416. If the state is not a new state, state transition may be updated at 418 and stored at 416. If the state has been updated, Event Graph 124 may determine whether the event is a known event, at 422. If the event is not a known event, a new event transition may be created at 424. The new event transition may be stored in a datastore at Event Graph 426. At Object Model 126, scene objects may be updated at 430. Object Model 126 may detect whether the objects are new, at 432. The objects may be stored at 434, in a datastore as shown by 436. Scene Objects may be transmitted or otherwise made available to create New State at 4141 as well as create new Event Transition at 424. FIG. 4 is an exemplary illustration; the steps may be modified and/or otherwise varied.

FIG. 1 also illustrates Task Model 130 within system 100. According to an embodiment of the present invention, Task Model 130 may store user defined tasks that, at their core, articulate queries of, or interactions with, the semantic objects of the external computer system (ECS). According to an embodiment of the present invention, a Task may be considered to be a discrete instruction or set of instructions that may be executed within the context of the ECS containing a specific set of starting states (expressed within Event Model 134) and ending states (expressed within Goal Model 136). The instruction or set of instructions that make up a task may be expressed as a combination of rules, represented by Rule Mode 132; high-level goals represented by Goal model 136, and traditional workflows represented by Workflow Model 138. Event Model 134 may receive events from Event Engine 164, and may utilize these events for such purposes as executing or terminating rule sets and workflows, or providing information to active goals or task. Task Model 130 may be structured to contain hierarchical data structures of additional Task Model 130.

According to an exemplary scenario, a Task Model 130 may be defined as TASK-X, with Rule Model 132 containing RULE-1, and Workflow Model 138 containing FLOW-1. In this example, FLOW-1 may be defined appropriately to execute STEP-1 and STEP-2 once initiated. RULE-1 may be defined appropriately to execute FLOW-1 when specific Event-A may be received via Event Engine 164. Upon initialization of TASK-X, RULE-1 may be immediately registered with Rules Engine 166 and begin executing, or in this example waiting for EVENT-A. Once RULE-1 receives EVENT-A, FLOW-1 may be registered with Workflow Engine 162 and begin execution with STEP-1. Further, STEP-1 may consult Goal Model 136 to further refine the details of the step's execution. Once STEP-1 has executed, FLOW-1 may transition to execute STEP-2. STEP-2 may be defined to wait for a distinct event from Event Engine 164 before proceeding.

According to an embodiment of the present invention, Rule Model 132 may store user-defined Rules, which may be organized into larger Rule Sets or other data structure. A rule may define a Condition and a Consequent. For example, if the Condition evaluates as TRUE, the Consequent of that rule may be invoked. Both Conditions and Consequents may be constructed by incorporating actions involving semantic objects (which may be defined within the Object Model) and/or workflows (which may be defined within the Workflow Model). Consequents may additionally fire events defined in Event Model 134 that are made available to execution system to be propagated via Event Engine 164. Rules may be organized into hierarchies that depend on their parent rules success in order to become active. Rules may also be assigned weights and priorities that may be used to overcome contentions that may arise if multiple Rules evaluate to TRUE at the same time. Facilities to categorize and classify these Rules and Rule Sets may also be present within the Rule Model.

According to an embodiment of the present invention, Event Model 134 allows the user to define Event Handlers, and/or actions that may be invoked if a given Event is detected. Events may be events of the ECS, as defined with the System Model, as well as custom user-defined Events. Event Handlers may be constructed by incorporating actions involving semantic objects (which may be defined within the Object Model), workflows (which may be defined within the Workflow Model), and/or the execution of other tasks. Any user-defined Event may be explicitly fired from within a Rule Consequent, from within an Event Handler, and/or from a general Task Workflow. Facilities to categorize and classify these Events may also be present within the Event Model.

According to an embodiment of the present invention, Goal Model 136 allows the user to define Goals that may be used to provide context to a Task. For example, a single task may incorporate one to many Goals, whereby the behavior of a Rule, Event, or Workflow may vary depending on the specificity of a given goal. Facilities to categorize and classify these Goals may also be present within the Goal Model.

According to an embodiment of the present invention, Workflow Model 138 allows the user to define Workflows that exist as flow charts incorporating actions involving semantic objects (which may be defined within the Object Model), events (which may be defined within the Event Model), other Tasks, and/or other workflows. Workflows may be simple and linear, or may be complex, using conditional constraints or forks and joins to determine behavior. In addition, Constraints may also be defined within a Workflow to specify alternate behaviors based on one or more conditions to be evaluated during the Workflow's execution may be present. And, facilities to categorize and classify these Goals may also be present within the Workflow Model.

Figure 5:
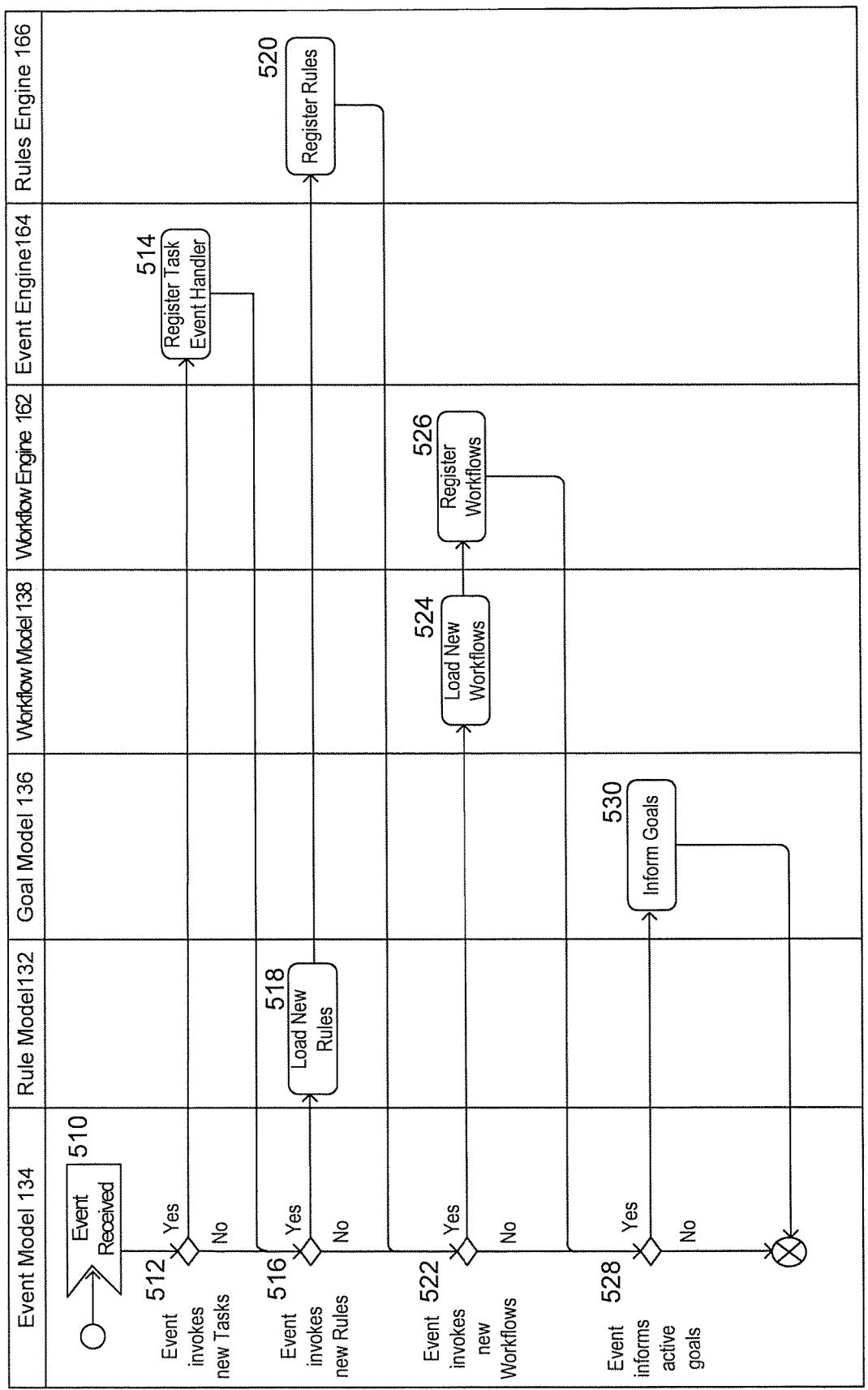
FIG. 5 is an exemplary flow diagram illustrating a Task Model, according to an embodiment of the present invention.

FIG. 5 is an exemplary flow diagram illustrating a Task Model, according to an embodiment of the present invention. FIG. 5 illustrates an exemplary interaction between and among Event Model 134, Rule Model 132, Goal Model 136, Workflow Model 138, Workflow Engine 162, Event Engine 164, Rules Engine 166. As shown in FIG. 5, an event may be received, at 510. Event Model 134 may determine whether the event invokes new tasks, at 512. If yes, Event Engine 164 may register task an event handler at 514. Event Model 134 may then determine whether the event invokes a new rule(s) at 516. If yes, Rule Model 132 may load the new rule(s) at 518. The new rule(s) may be registered by Rules Engine 166, at 520. Event Model 134 may then determine whether the event invokes a new workflow(s), at 522. If yes, the new workflow(s) may be loaded at 524, by Workflow Model 138. Workflow Engine 162 may then register the workflow(s), at 526. Event Model 134 may determine whether the event informs active goals, at 528. If yes, Goal Model 136 may be informed of the goals, at 530. FIG. 5 is an exemplary illustration; the steps may be modified and/or otherwise varied.

FIG. 1 also illustrates Role Model 140 within system 100. According to an embodiment of the present invention, Role Model 140 stores the user-defined roles that individually aggregate a large set of instructions specific to that role. Role Model 140 provides the ability to prioritize and plan the execution of those instructions within the scope of a current operation. The instruction set that makes up a role may be constructed by incorporating one or more tasks in Task Model 148. Task Model 148 correlates tasks defined within Task Model 130 that are associated with the specific role represented by Role Model 140. Additionally, Role Model 140 may define higher-order rules (represented by Rule Mode 142), goals (represented by Goal Model 146), and workflows (represented by Workflow Model 147) that operate independently of those specified within the role's tasks (e.g., Rule Model 132, Goal Model 136, and Workflow Model 138). Event Model 144 may receive events from Event Engine 164 and may execute or terminate owned tasks, rule sets, and workflows based on this event. Role Model 140 may be structured to contain hierarchical data structures of additional Role Model 140.

An example of a role could be the equivalent to the duties performed by a human user upon a computer system, represented as ROLE-X (an instance of Role Model 140). Specific to that role may be the tasks TASK-A, TASK-B, and TASK-C, in order of priority. Each of these tasks may be defined in Task Model 130, but correlated specifically to ROLE-X within Task Model 148. In normal operation, ROLE-X may initialize itself by executing TASK-B. During the course of operation, an event may be received via Event Model 144 that informs ROLE-X that higher priority TASK-A should be initiated. Rule Model 142 may then choose to suspend the TASK-B, and begin execution of TASK-A. Once Event Model 144 receives the event that TASK-A has completed, Rule Model 142 may then choose to resume TASK-B.

Similar to the Rule Model described in connection with Task model 130 above, Rule Model 142 may define Rules specific to the Role. These Rules operate independently, but in conjunction with any rules that are defined within a Task of a given Role.

Similar to the Event Model described in connection with Task model 130 above, Event Model 144 may define Events and Event Handlers specific to the Role. These Events and their Handlers operate independently, but in conjunction with any Events that are operating within a Task of a given Role.

Similar to the Goal Model described in connection with Task model 130 above, Goal Model 146 may define Goals specific to the Role.

Similar to the Workflow Model described in connection with Task model 130 above, Workflow Model 147 may define Workflows specific to the Role.

According to an embodiment of the present invention, the Task Model 148 may define the Tasks that are associated with a given Role. Facilities to categorize and classify these Tasks may also be present within the Task Model 148.

Figure 6:
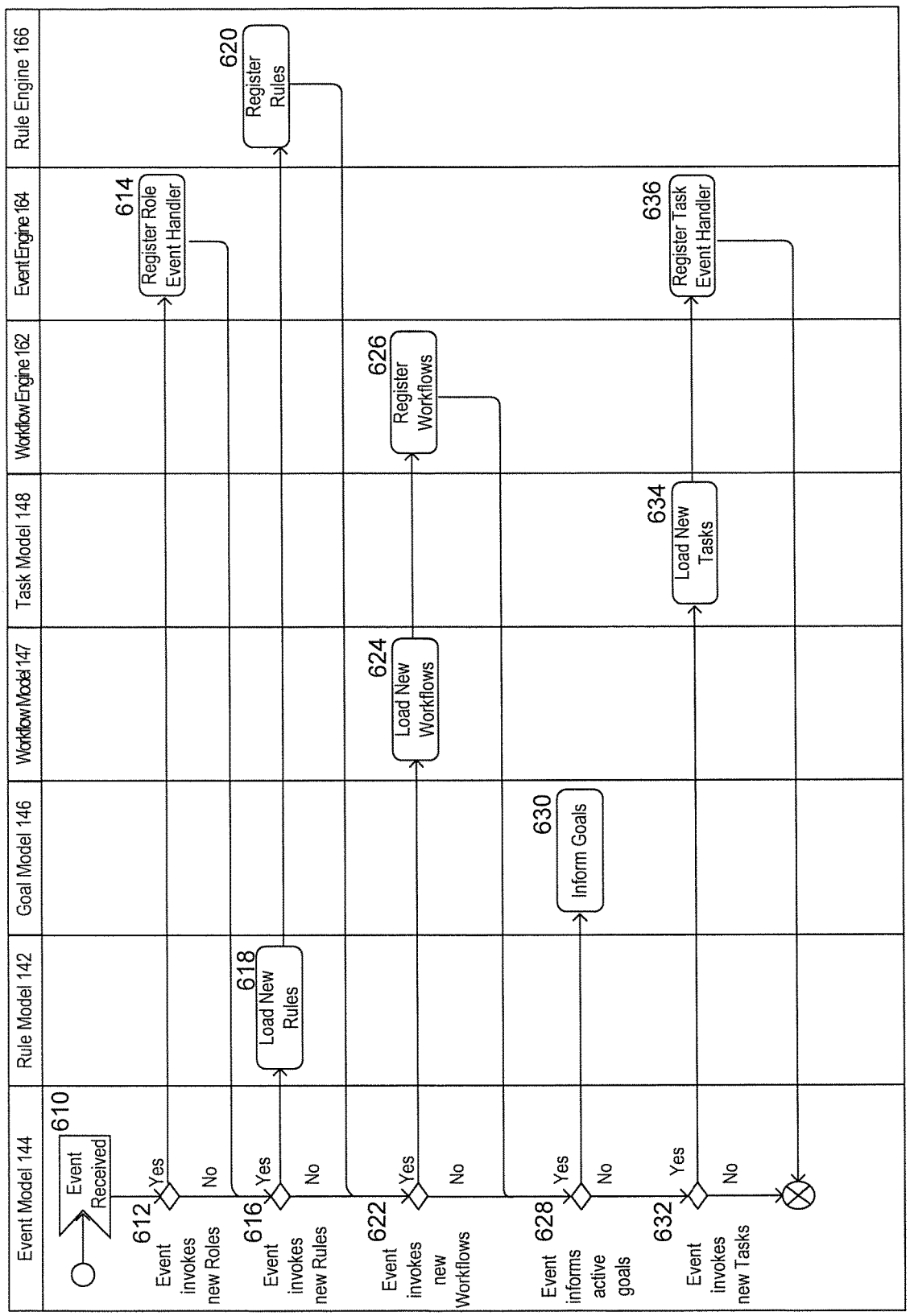
FIG. 6 is an exemplary flow diagram illustrating a Role Model, according to an embodiment of the present invention.

FIG. 6 is an exemplary flow diagram illustrating a Role Model, according to an embodiment of the present invention. FIG. 6 illustrates an exemplary interaction between and among Event Model 144, Rule Model 142, Goal Model 146, Workflow Model 147, Task Model 148, Workflow Engine 162, Event Engine 164 and Rules Engine 166. As shown in FIG. 6, an event may be received at Event Model 144, as shown by 610. Event Model 144 may determine whether the event invokes a new role(s), at 612. If yes, Event Engine 164 may register a role event handler, at 614. Event Model 144 may determine whether the event invokes a new rule(s), at 616. If yes, Rule Model 142 may load the new rule(s), at 618. Rules Engine 166 may register the rule(s), at 620. Event Model 144 may determine whether the event invokes a new workflow(s), at 622. If yes, Workflow Model 147 may load the new workflow(s), at 624. Workflow Engine 162 may register the workflow(s), at 626. Event Model 144 may then determine whether the event informs active goals. If yes, Goal Model 146 may inform goals, at 630. If no, Event Model 144 may determine whether the event invokes a new task(s), at 632. If yes, Task Model 148 may load the new task(s), at 634. Event Engine 164 may register a task event handler, at 636. FIG. 6 is an exemplary illustration; the steps may be modified and/or otherwise varied.

FIG. 1 also illustrates Learning System 150 within system 100. According to an embodiment of the present invention, Learning System 150 may provide machine learning and artificial intelligence capabilities necessary to evolve the definition and execution of high level Roles and Tasks to support the complexities inherent to each. Learning System 150 may operate by utilizing and expanding Semantic System 110 and/or System Model 120 to make predictions and/or decisions relevant to the operations of an external computer system (ECS).

For example, the tasks inherent to the Learning System may be classified into Supervised and Unsupervised learning methodologies. A combination of the two (or hybrid) may also be implemented.

With Supervised learning, Learning System 150 may be given a set of data or other inputs and then attempt to derive a desired output. This output may then be presented to a user via a Supervised Learning Interface 180. The user (or other responding entity) may then inform the system whether the results are correct or not. Correct responses increase the confidence level that the Learning System applies to rules it has generated to derive the result. Learning System 150 may employ a confidence threshold that, when exceeded, signifies that the given methodology is acceptable to be used in general operations. Other indicia or measure of confidence may be implemented.

An example of supervised learning may include identifying new Rules that are relevant to a specified Goal. In this example, a user presents the Learning System with a specific State of the ECS, an applicable goal, and a desired response. The Learning System may be instructed to derive rules that map the given inputs to the desired output. Via Supervised Learning Interface 180, the user may inform the system if its results are correct or not. Whether the results were correct or not may also be automatically determined. When enough confidence has been achieved, that Rule may be added to a Rule Model, and associated with the respective State and Goal that Rule is applicable to. Other indicia or measure of confidence may be implemented.

Another example of supervised learning may include identifying semantic objects from raw GUI data received from the ECS. In this example, a user may present Learning System 150 with GUI data, and a desired semantic object. The Learning System may be instructed to derive rules that map the given GUI data to the desired semantic object. Via the Supervised Learning Interface 180, the user may inform the system if its results are correct or not. Whether the results were correct or not may also be automatically determined. When enough confidence has been achieved, the Semantic System can be updated with the information to detect this new semantic object. Other indicia or measure of confidence may be implemented.

According to an embodiment of the present invention, Learning System 150 may employ unsupervised learning to define new relationships within the System Model of the ECS. As this unsupervised learning methodology does not utilize guidance from a user, an embodiment of the present invention may not implement error or confidence measures associated to the relationships defined therein.

An example of unsupervised learning may include constructing new relationships between States, Goals, Tasks, and Events within the ECS. In this example, the Learning System may derive new Goals and Tasks by interpreting the related States and Events that are executed with a user's session with the ECS. Another example may include operating the ECS autonomously (via Execution System 160) in an exploratory manner to identify new States and the events to achieve them, similarly classifying them as new Goals and Tasks. New States or Events may subsequently be persisted into the System Model, and new Goals and Tasks may be persisted into the Task Model, for example.

Figure 7:
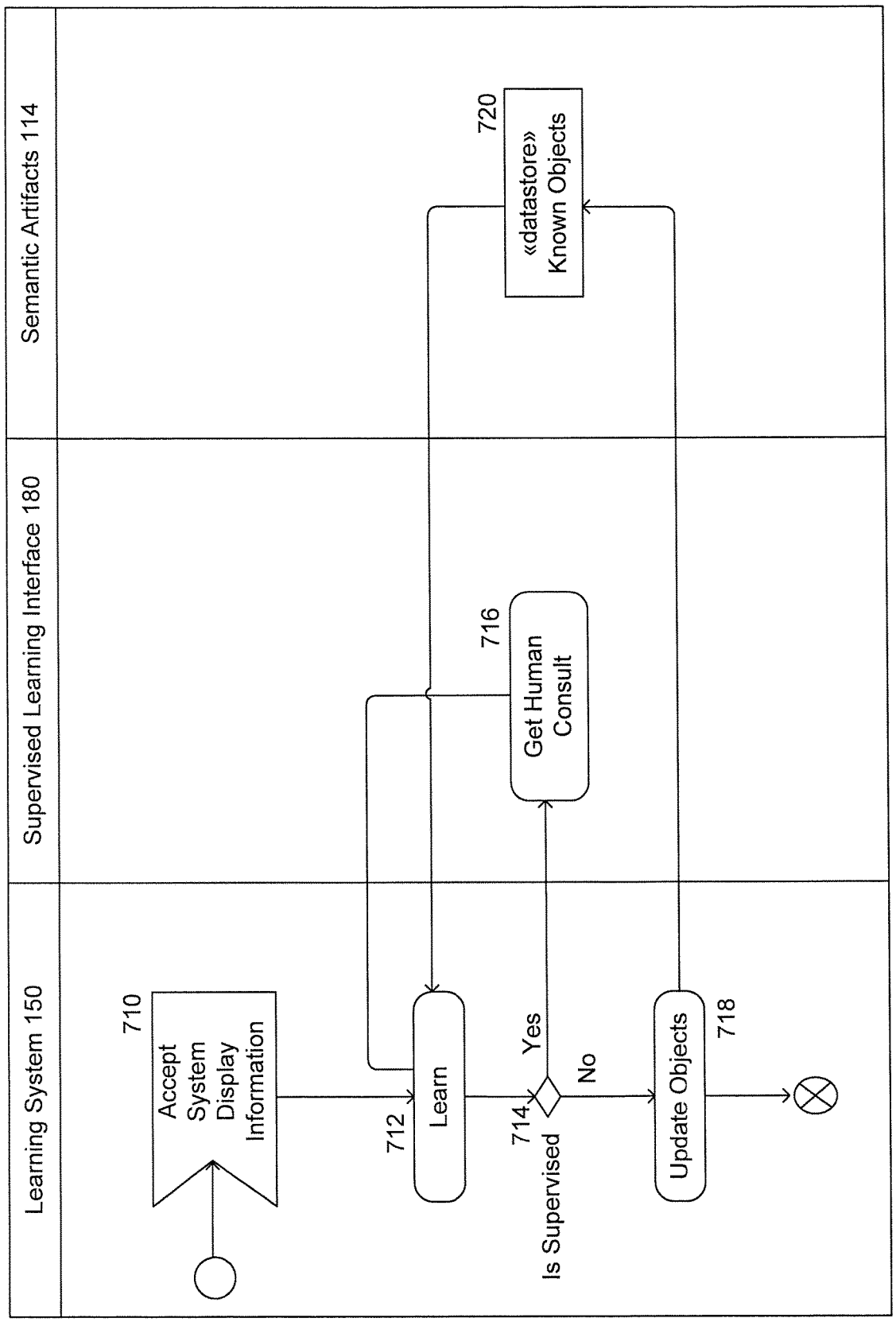
FIG. 7 is an exemplary flow diagram illustrating a Learning System, according to an embodiment of the present invention.

FIG. 7 is an exemplary flow diagram illustrating a Learning System, according to an embodiment of the present invention. FIG. 7 illustrates an exemplary interaction between and among Learning System 150, Supervised Learning Interface 180 and Semantic Artifacts 114. As shown in FIG. 7, Learning System 150 may accept system display information, at 710. Learning System may execute a learning algorithm, e.g., machine learning, artificial intelligence, at 712. Learning System 150 may determine whether the learning is supervised or not. If the learning is supervised, Supervised Learning Interface 180 may receive human consult or other input, at 716, where the input is then provided back to Learning Algorithm 712. If the learning is not supervised, Learning System 150 may update objects, at 718. Known objects may then be stored in a database by Semantic Artifacts 114, at 720. FIG. 7 is an exemplary illustration; the steps may be modified and/or otherwise varied.

FIG. 1 also illustrates Execution System 160 within system 100. According to an embodiment of the present invention, Execution System 160 may be responsible for the execution of Roles and Tasks as defined by their respective models against the External Computer System (ECS) 102. Execution System 160 may derive Workflows via Workflow Engine 162, Rules via Rules engine 166, Events via Event Engine 164, and States required by a given Role or Task, via State Engine 170, and employs the respective engine to manage the execution of each, via Planning Engine 168. Execution Engine 160 may provide facilities to maintain continuity of these separate executions under the high-level context of the relevant Role or Task.

Execution System 160 may perform its operations either directly or remotely upon an ECS, either via direct interfaces including, but not limited to USB, PS/2, Serial port, and/or parallel port, or via remoting interfaces including, but not limited to, VNC and RDP.

According to an embodiment of the present invention, Workflow Engine 162 may be responsible for the execution of Workflows as defined by the Workflow Model (138, 147). As a Workflow may be a heterogeneous mixture of semantic object actions, Events, Tasks, and sub-workflows, and organized in a fashion similar to a flow chart. Workflow Engine 162 has the ability to execute elements of these types, respecting their flow configuration, both serially and in parallel. Workflow Engine 162 also provides the ability to evaluate constraints defined by the Workflow Model (138, 147) to determine whether or not segments of the Workflow should be traversed. Workflow Engine 162 may execute parallel Workflows through the use of fork, join, and/or other similar controls. A parallel Workflow may include an execution path that diverges within a single instance of the Workflow Engine, and then converges either at a join control specified within the Workflow Model, or at the implicit join that occurs at the end of each distinct Workflow.

Workflow Engine 162 may rely upon the use of Semantic System 110 to identify the semantic objects specified within the Workflow Model (138, 147) during the course of execution. In addition, Workflow Engine 162 may rely upon the use of Event Engine 164 to execute Events specified within the Event Model (134, 144) during the course of execution. Workflow Engine 162 may rely upon the use of Planning Engine 168 to derive additional actions required to be executed outside of those explicitly specified by the Workflow Model (138, 147).

Figure 8:
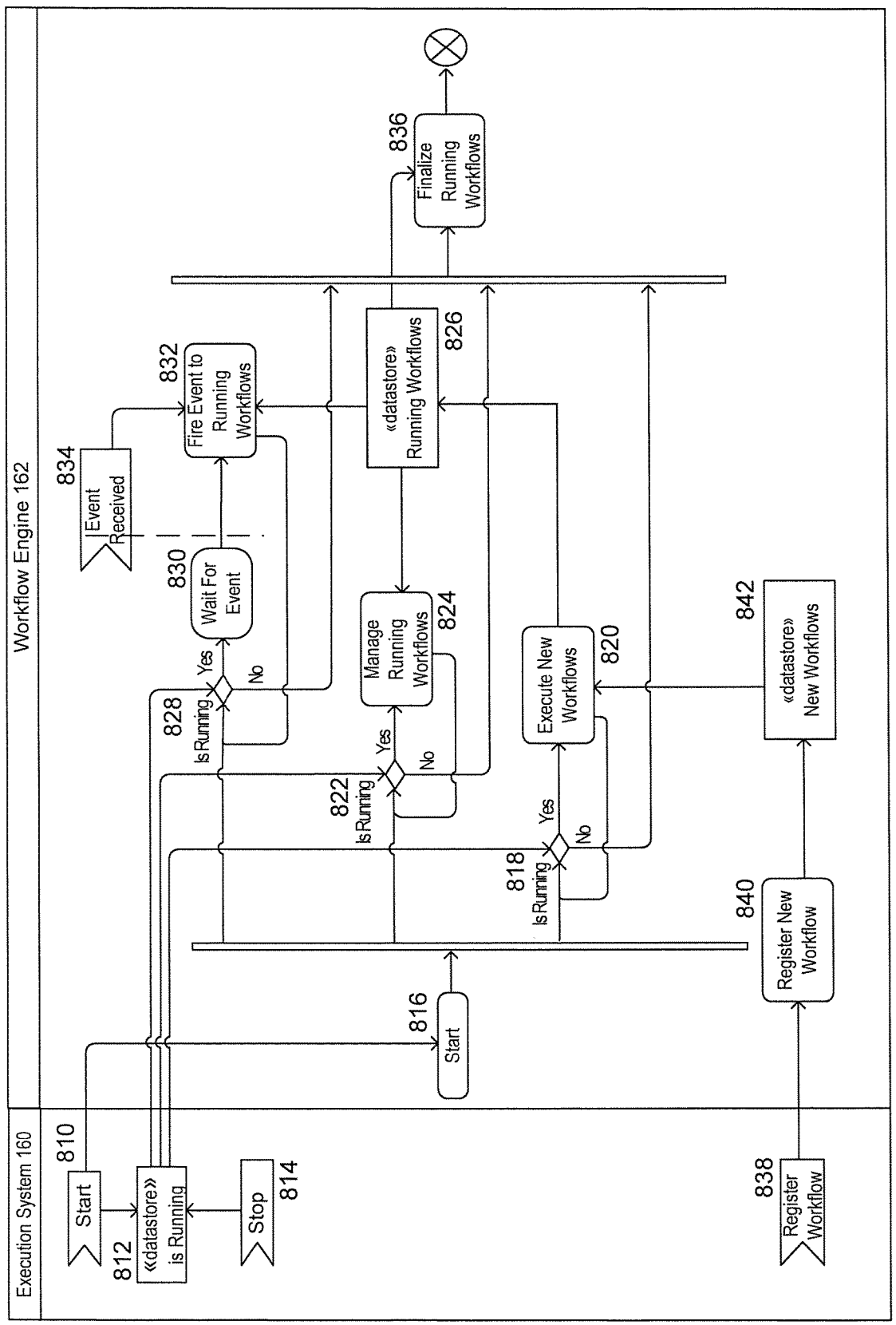
FIG. 8 is an exemplary flow diagram illustrating a Workflow Engine, according to an embodiment of the present invention.

FIG. 8 is an exemplary flow diagram illustrating a Workflow Engine, according to an embodiment of the present invention. FIG. 8 illustrates an exemplary interaction between Execution System 160 and Workflow Engine 162. As shown in FIG. 8, Execution System 160 may start execution, as shown by 810. At 812, Execution System 160 may execute one or more workflows, as shown by 812. A stop command may occur at 814. Workflow Engine 162 may start execution, at 816. In response, Workflow Engine 162 may initiate one or more workflows. Workflow Engine 162 may determine whether a workflow is running at 818. If yes, new workflows may be executed at 820. For example, Execution System 160 may register a workflow, at 838. In response, Workflow Engine 162 may register a new workflow at 840, and store the new workflow in a datastore at Workflow Engine 162, as shown by 842. The new workflows may be accessed and executed by Workflow Engine 162, as shown by 820. Running workflows may be stored at a database, as shown by 826. Also, Workflow Engine 162 may determine whether a workflow is running at 822. If yes, Workflow Engine 162 may manage running workflows, at 824. In addition, Workflow Engine 162 may determine whether a workflow is running at 828. If yes, Workflow Engine 162 may wait for an event, as shown by 830. Workflow Engine 162 may then fire an event to running workflows at 832. In addition, Workflow Engine 162 may receive events at 834. Workflow Engine may then finalize running workflows at 836. FIG. 8 is an exemplary illustration; the steps may be modified and/or otherwise varied.

According to an embodiment of the present invention, Rules Engine 166 may be responsible for the execution of Rules and Rule Sets as defined by the Rule Model (132, 142). As Rules may be organized hierarchically, and either enabled or disabled by the properties of parent Rules, Rules Engine 166 provides the ability to determine and modify what Rules are active at any given moment of the execution. Rules Engine 166 may be responsible for evaluating active Rules continuously and in parallel, and evaluating if the Condition of any Rule evaluates to TRUE. Should more than one Rule Condition evaluate to TRUE, Rules Engine 166 provides the ability to evaluate the respective weights and priorities of applicable Rules in order to choose the Rule most likely to be relevant to a given state. Rules Engine 166 provides the ability to execute the Consequent of a Rule, as one or more semantic object actions, Events, Tasks, or Workflows.

Rules Engine 166 may rely upon the use of Semantic System 110 to identify the semantic objects specified within the Rule Model (132, 142) during the course of execution. In addition, Rules Engine 166 may rely upon the use of Workflow Engine 162 to execute Workflows specified within the Rule Model (132, 142) during the course of execution. Rules Engine 166 may further rely upon the use of Events Engine 164 to execute Events specified within the Rule Model (132, 142) during the course of execution. For example, Rules Engine 166 may rely upon the use of Planning Engine 168 to derive additional actions required to be executed outside of those explicitly specified by the Rule Model (132, 142).

Figure 9:
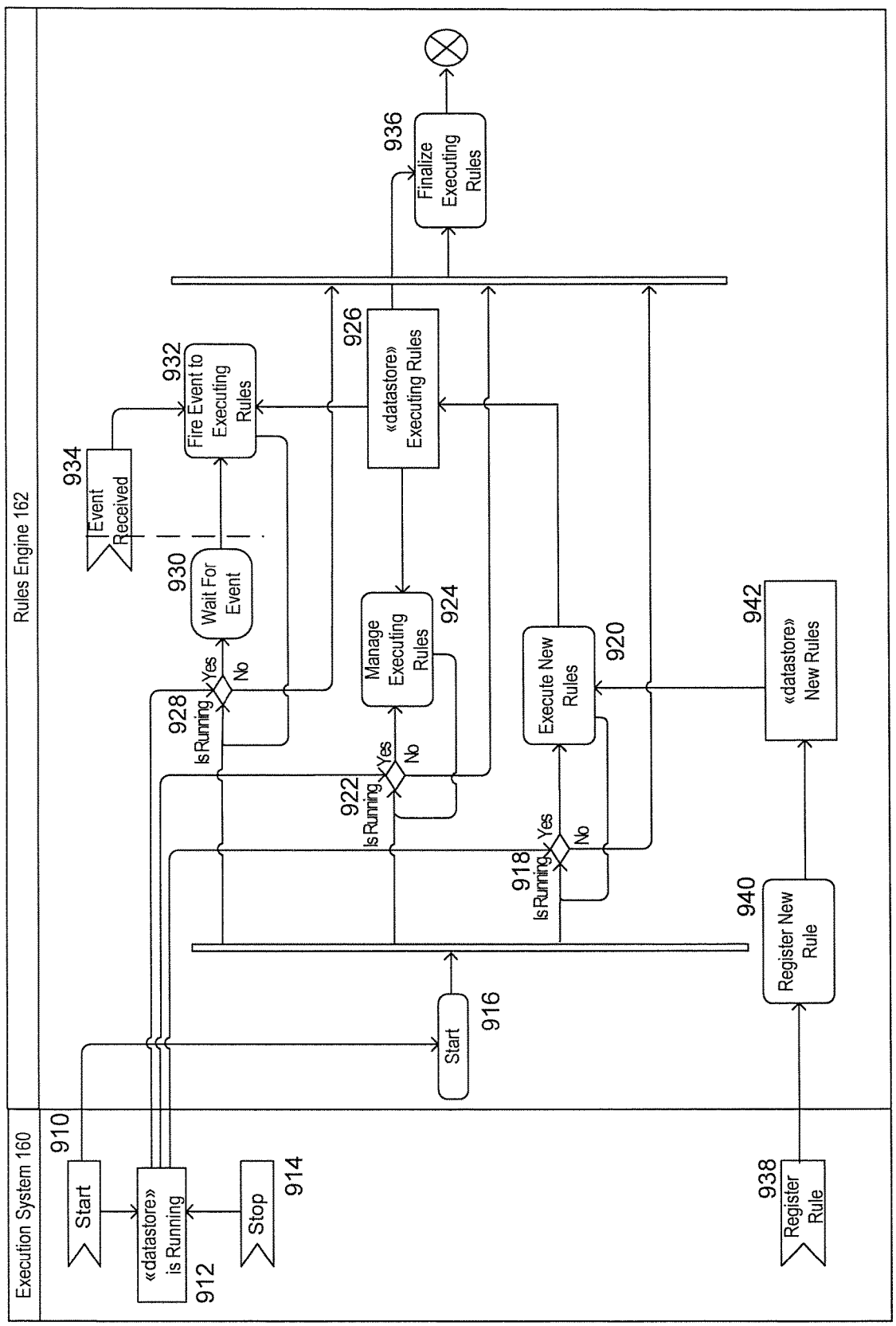
FIG. 9 is an exemplary flow diagram illustrating a Rules Engine, according to an embodiment of the present invention.

FIG. 9 is an exemplary flow diagram illustrating a Rules Engine, according to an embodiment of the present invention. FIG. 9 illustrates an exemplary interaction between Execution System 160 and Rules Engine 166. As shown in FIG. 9, Execution System 160 may start execution, as shown by 910. At 912, Execution System 160 may execute one or more rules, as shown by 912. A stop command may occur at 914. Workflow Engine 162 may start execution, at 916. In response, Rules Engine 166 may initiate one or more rules. Rules Engine 166 may determine whether a rule is running at 918. If yes, new rules may be executed at 920. For example, Execution System 160 may register a rule, at 938. In response, Rules Engine 166 may register a new rule at 940, and store the new rule in a datastore at Rules Engine 166, as shown by 942. The new rules may be accessed and executed by Rules Engine 166, as shown by 920. Executing rules may be stored at a database, as shown by 926. Also, Rules Engine 166 may determine whether a rule is running at 922. If yes, Rules Engine 166 may manage executing rules, at 924. In addition, Rules Engine 166 may determine whether a workflow is running at 928. If yes, Rules Engine 166 may wait for an event, as shown by 830. Rules Engine 166 may then fire an event to executing rules at 932. In addition, Rules Engine 166 may receive events at 934. Rules Engine 166 may then finalize executing rules at 936. FIG. 9 is an exemplary illustration; the steps may be modified and/or otherwise varied.

According to an embodiment of the present invention, Event Engine 164 may be responsible for detecting Events and executing their respective Event Handlers, which may be defined within Event Model (134, 144). As Events are applicable to specific States of the ECS, Event Engine 164 provides the ability to determine and modify what Events are in scope of being detected at any given moment of the execution. Once an Event is detected, Event Engine 164 provides the ability to execute the Event Handler of the Event, as one or more semantic object actions, Tasks, Workflows, or subsequent Events.

For example, Event Engine 164 may rely upon the use of Semantic System 110 to identify the semantic objects specified within the Event Model (134, 144) during the course of execution. Event Engine 164 may rely upon the use of Workflow Engine 162 to execute Workflows specified within Event Model (134, 144) during the course of execution. Event Engine 164 may rely upon the use of Events Graph 124, as defined within System Model 120, to identify applicable Events during the course of execution. Event Engine 164 may rely upon the use of Planning Engine 168 to derive additional actions required to be executed outside of those explicitly specified by the Event Model 134; 144.

Figure 10:
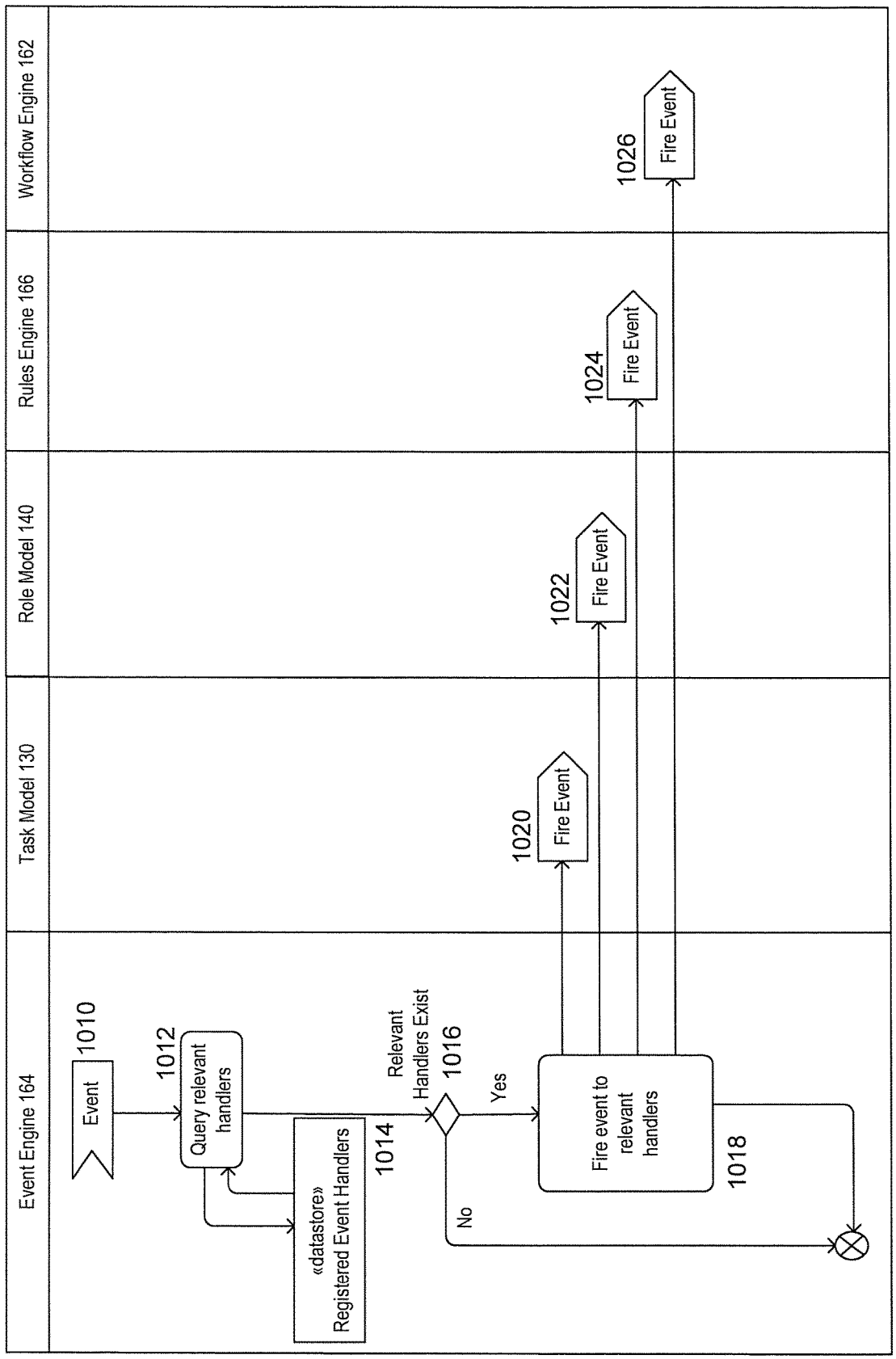
FIG. 10 is an exemplary flow diagram illustrating an Event Engine, according to an embodiment of the present invention.

FIG. 10 is an exemplary flow diagram illustrating an Event Engine, according to an embodiment of the present invention. FIG. 10 illustrates an exemplary interaction between Event Engine 164, Task Model 130, Role Model 140, Rules Engine 166 and Workflow Engine 162. Event Engine 164 receives an Event, at 1010. Event Engine 164 may query relevant handlers, at 1012 Specifically, datastore may support registered event handlers, at 1014. Event Engine 164 may determine whether relevant handlers exist, at 1016. If yes, Event Engine 164 may then fire events to relevant handlers, at 1018. Specifically, events may be fired to Task Model 130, as shown by 1020; Role Model 140 as shown by 1022; Rules Engine 166 as shown by 1024 and Workflow Engine 162 as shown by 1026. FIG. 10 is an exemplary illustration; the steps may be modified and/or otherwise varied.

According to an embodiment of the present invention, State Engine 170 may be responsible for detecting States of the ECS, as well as, State changes that occur during the course of execution. State Engine 170 provides the ability to disseminate the current State to components of the Execution System, as well as, firing a specialized State Changed Event to the Event Engine 164.

For example, State Engine 170 may rely upon the use of Semantic System 110 to identify the semantic objects that, in conjunction with System Model 120, State Graph 122 and Object Model 126, assist in defining the current State of the ECS. State Engine 170 may rely upon the use of Planning Engine 168 to derive the current state should an explicit State not be discernable from the immediate information available to the current execution.

According to an embodiment of the present invention, Planning Engine 168 may be responsible for interpreting incongruences between expected and actual states of the ECS and deriving an execution plan to resolve this discrepancy. Planning Engine 168 may rely upon State Engine 170 and System Model 120 to identify the actual and expected States of the ECS. Through use of the State Graph 122, Planning Engine 168 may then determine an optimal path and action executions to achieve the expected State. Planning Engine 168 may also make use of relevant goals, as defined within the Goal Model 136, to assist in the planning process. Other data and considerations may be included.

Planning Engine 168 may also be utilized to interpret a current state should State Engine 170 not have enough information to do so independently. By processing the state transitions that preceded the current state, Planning Engine 168 may inspect the State Graph 122 of System Model 120 to identify the current possible States. Through use of heuristic and probability algorithms, Planning Engine 168 may then interpret the current State as an existing State, or as a new State not previously encountered.

Planning Engine 168 provides the ability to update and/or modify Role, Task, and System Models to include any additional actions or States that may be relevant, thereby reducing the need for employing the Planning System on subsequent executions.

Figure 11:
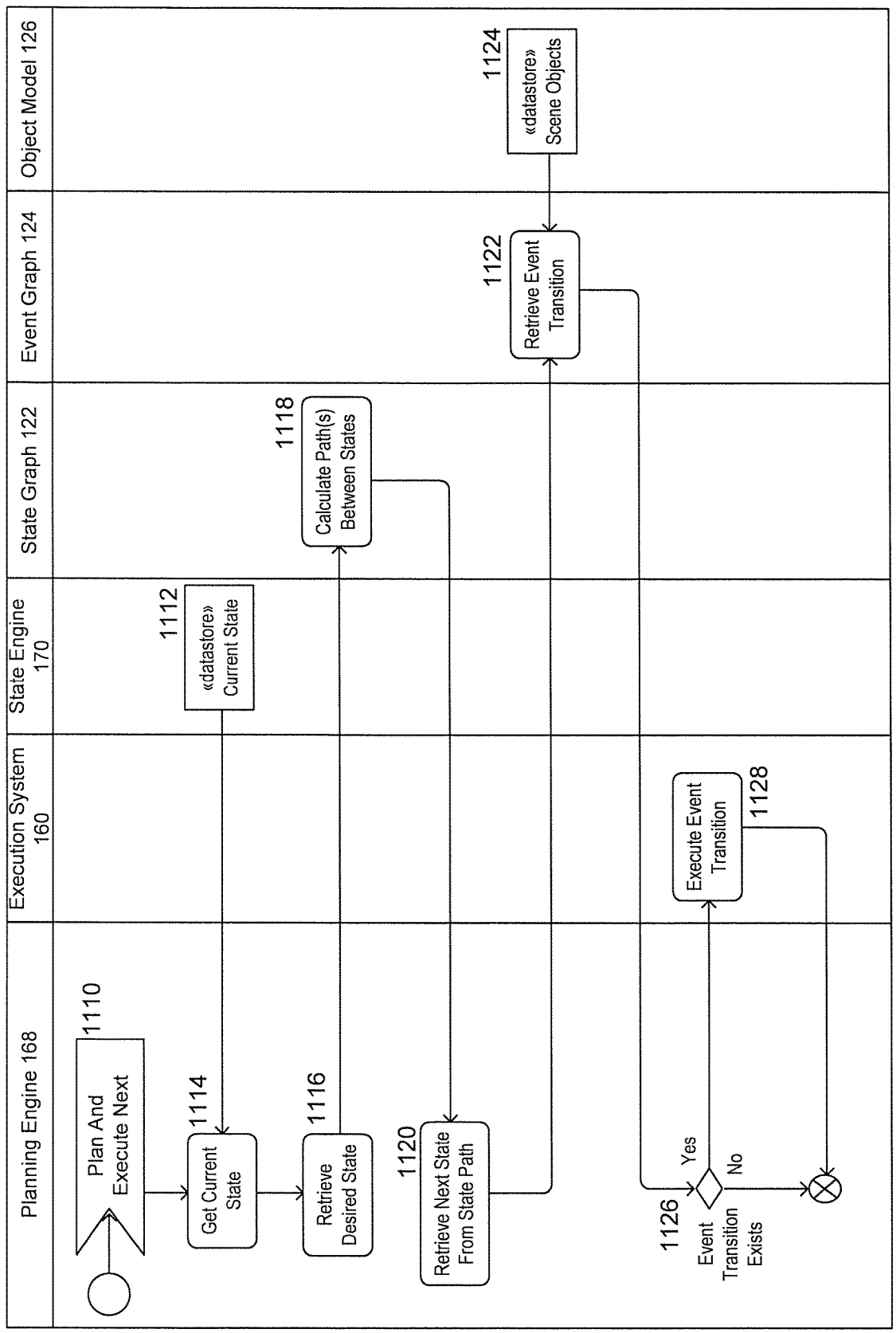
FIG. 11 is an exemplary flow diagram illustrating a Planning Engine, according to an embodiment of the present invention.

FIG. 11 is an exemplary flow diagram illustrating a Planning Engine, according to an embodiment of the present invention. FIG. 11 illustrates an exemplary interaction between Planning Engine 168, Execution System 160, State Engine 170, State Graph 122, Event Graph 124 and Object Model 126. Planning Engine 168 may plan and execute, at 1110. State Engine 170 may store current state data, at 1112. Planning Engine 168 may then retrieve or receive current state, at 1114. Planning Engine 168 may then retrieve desired state at 1116. State Graph 122 may calculate a path or paths between the states, at 1118. Planning Engine 168 may then retrieve a next state from the state path, at 1120. Event Graph 124 may retrieve event transition, at 1122. Object Model 126 may manage and store scene objects, at 1124. Planning Engine 168 may determine whether an event transition exists at 1126. If yes, Execution System 160 may execute event transition, at 1128. FIG. 11 is an exemplary illustration; the steps may be modified and/or otherwise varied.

According to an exemplary application, an embodiment of the present invention may be integrated with an Automated Test and Re-Test (ATRT) process and suite of technologies to address automated testing of large complex systems and systems-of-systems, as detailed in related applications U.S. patent application Ser. No. 13/605,182, filed on Sep. 6, 2012, now U.S. Pat. No. 8,826,084, issued on Sep. 2, 2014, which claims priority to Provisional Application No. 61/531,769 filed on Sep. 7, 2011; U.S. patent application Ser. No. 13/687,311, filed on Nov. 28, 2012, now U.S. Pat. No. 9,135,714, issued Sep. 15, 2015, which claims priority to Provisional Application No. 61/564,009 filed on Nov. 28, 2011 and U.S. patent application Ser. No. 13/718,295, filed on Dec. 18, 2012, which claims priority to Provisional Application No. 61/577,298 filed on Dec. 19, 2011. Automated test and retest procedures may include model-driven automated software testing. A focus of the ATRT system is directed to reducing time and effort involved in conducting system integration and testing while expanding the depth and breadth of test requirement coverage. As a result, projects demonstrate a substantial reduction in test time while expanding test requirement coverage.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the tell "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only.

The invention claimed is:

1. A computer implemented system that automates development, maintenance and execution of procedures to autonomously interact with one or more external devices, the system comprising:

an input configured to receive interaction data and to detect state data from an external computer system, the user interaction data comprising GUI data that represents how the external computer system performs and the state data represents current properties of the external Computer system;

a memory component configured to store the interaction data, the state data and relationship data between objects, events and resultant states where an event represents an interaction with the external computer system and where a resultant state represents a state resulting from an interaction;

a semantic processor configured to interpret the interaction data into semantic objects and configured to develop a system model, using a learning algorithm, based on the semantic objects, the state data and the relationship data, the system model comprises a state graph, an event graph and an object model wherein the state graph represents a detected status of the external computer system and the event graph represents relationships between semantic objects, events, and resulting external computer system state, wherein a planning engine uses the state graph and the event graph to identify a current state as an existing state or a new state not previously encountered and to calculate one or more paths between the current state and a desired state; and an execution processor configured to execute a plurality of tasks and a plurality of roles, where each task of the plurality of tasks defines a set of interactions with one or more semantic objects, each task comprises a set of starting states defining an event and a set of ending states defining a goal and where each role of the plurality of roles represents a set of instructions specific to a scope of operation for a specific type of user and each role is associated with a corresponding set of unique tasks; where the execution processor derives, responsive to the system model, a combination of: workflow, rules, events and states required by a given task or role and further employs a respective engine for each task or role.

2. The system of claim 1, wherein the semantic objects comprise one or more of: icons, imagery and graphical elements.

3. The system of claim 1, wherein each semantic object is associated with a corresponding resultant state.

4. The system of claim 3, wherein the resultant states are organized into hierarchies that define a plurality of possible new states reachable from a given state.

5. The system of claim 1, wherein each task is further defined by a combination of rules, event handler, goals and workflows.

6. The system of claim 1, wherein each role is further defined by incorporating one or more tasks.

7. The system of claim 1, wherein each role is further defined by a combination of rules, event handlers, goals and workflows.

8. The system of claim 1, further comprising a learning system that executes the learning algorithm and provides machine learning and artificial intelligence to evolve definition and execution of roles and tasks.

9. The system of claim 8, wherein the learning system implements supervised learning.

10. The system of claim 8, wherein the learning system implements unsupervised learning.

11. A computer implemented method that automates development, maintenance and execution of procedures to autonomously interact with one or more external devices using an interactive interface provided by a computer processor, the method comprising the steps of:

receiving, via an electronic input, interaction data and state data from an external computer system, the user interaction data comprising GUI data that represents how the external computer system performs and the state data represents current properties of the external Computer system;

storing, via a memory component, the interaction data, the state data and relationship data between objects, events and resultant states where an event represents an interaction with the external computer system and where a resultant state represents a state resulting from an interaction;

interpreting, via a semantic processor, the interaction data into semantic objects and developing a system model, using a learning algorithm, based on the semantic objects, the state data and the relationship data, the system model comprises a state graph, an event graph and an object model wherein the state graph represents a detected status of the external computer system and the event graph represents relationships between semantic objects, events and resulting external computer system state, wherein a planning engine uses the state graph and the event graph to identify a current state as an existing state or a new state not previously encountered and to calculate one or more paths between the current state and a desired state; and executing, via an execution processor, a plurality of tasks and a plurality of roles, where each task of the plurality of tasks defines a set of interactions with one or more semantic objects, each task comprises a set of starting states defining an event and a set of ending states defining a goal and where each role of the plurality of roles represents a set of instructions specific to a scope of operation for a specific type of user and each role is associated with a corresponding set of unique tasks; where the execution processor derives, responsive to the system model a combination of: workflow, rules, events and states required by a given task or role and further employs a respective engine for each task or role.

12. The method of claim 11, wherein the semantic objects comprise one or more of: icons, imagery and graphical elements.

13. The method of claim 11, wherein each semantic object is associated with a corresponding resultant state.

14. The method of claim 13, wherein the resultant states are organized into hierarchies that define a plurality of possible new states reachable from a given state.

15. The method of claim 11, wherein each task is further defined by a combination of rules, event handler, goals and workflows.

16. The method of claim 11, wherein each role is further defined by incorporating one or more tasks.

17. The method of claim 11, wherein each role is further defined by a combination of rules, event handlers, goals and workflows.

18. The method of claim 11, further comprising the step of:

executing the learning algorithm, via a learning system, machine learning and artificial intelligence to evolve definition and execution of roles and tasks.

19. The method of claim 18, wherein the learning system implements supervised learning.

20. The method of claim 18, wherein the learning system implements unsupervised learning.

* * * * *